United States Patent [19]
Nellums

[11] Patent Number: 5,460,060
[45] Date of Patent: Oct. 24, 1995

[54] TRANSMISSION SHIFTING MECHANISM WITH SPRING LOADED BALL SCREW

[75] Inventor: Richard A. Nellums, Farmington Hills, Mich.

[73] Assignee: Eaton Corporation, Cleveland, Ohio

[21] Appl. No.: 280,966

[22] Filed: Jul. 27, 1994

[51] Int. Cl.$^6$ .................................................. F16H 59/04
[52] U.S. Cl. ...................... 74/473 R; 74/89.15; 74/375; 192/84 C; 192/109 A
[58] Field of Search ............................. 74/473 R, 89.15, 74/375, 424.8 NA; 192/35, 48.2, 48.91, 84 C, 109 A

[56] References Cited

U.S. PATENT DOCUMENTS

| | | | |
|---|---|---|---|
| 2,214,901 | 9/1940 | Griffin | 192/84 C |
| 2,307,676 | 1/1943 | Harlan | 74/473 R |
| 2,492,205 | 12/1949 | Warner | 192/84 C |
| 3,611,823 | 10/1971 | Richards et al. | 74/331 |
| 4,291,586 | 9/1981 | Buetemeister | 74/89.15 X |
| 4,425,814 | 1/1984 | Dick | 74/89.15 |
| 4,428,248 | 1/1984 | Broucksou et al. | 74/335 |
| 4,449,416 | 5/1984 | Huitema | 74/89.15 X |
| 4,494,419 | 1/1985 | Inui et al. | 74/473 R X |
| 4,498,350 | 2/1985 | Ross | 74/89.15 |
| 5,408,898 | 4/1995 | Steeby et al. | 74/473 R |

Primary Examiner—Charles A. Marmor
Assistant Examiner—Troy Grabow
Attorney, Agent, or Firm—Loren H. Uthoff, Jr.; Howard D. Gordon

[57] ABSTRACT

A transmission shifting system for axially displacing a shift fork in response to an electrical signal using a ball ramp actuator to load a spring disposed between the ball ramp actuator and the shift fork where an electrical coil is energized to induce an electromagnetic field in a drive flange connected to a rotating driveshaft which causes the ball ramp actuator to axially expand thereby preloading the spring and causing a jaw clutch to be axially displaced by the shift fork to rotationally engage a transmission gear.

5 Claims, 2 Drawing Sheets

TRANSMISSION SHIFTING MECHANISM WITH SPRING LOADED BALL SCREW

RELATED APPLICATIONS

This application relates to U.S. patent application Ser. No. 08/150,672 entitled "Preselect Shift Strategy Using Stored Energy", filed on Nov. 10, 1993 and assigned to the same assignee, Eaton Corporation, as this application.

BACKGROUND OF THE INVENTION

1. Field of the Invention

The present invention relates to a shifting mechanism for a gear change transmission and more specifically to a shifting mechanism for a gear change transmission where the shift forks are moved by a plurality of springs loaded by a plurality of ball screw actuators.

2. Description of the Prior Art

Gear change transmissions utilizing shift bar housing assemblies wherein one or more axially moveable shift bars, also known as shift rails and shift rods, each carrying or associated with a shift fork, are selectively axially moved to engage or disengage a selected transmission gear by axial movement of a clutch member, or of a gear carrying clutch teeth or of a jaw clutch, are well known in the prior art, as may be seen by reference to U.S. Pat. Nos. 3,105,395; 3,283,613; 3,611,823; 4,152,949; 4,194,410; and 4,445,393; 4,754,665; 4,876,924; and 5,053,961, the disclosures of which are hereby incorporated by reference.

Non-operator actuated shift bar housing assemblies, usually actuated by pressurized hydraulic fluid, pressurized air, or electric motors and the controls therefor, are also well known in the prior art, as may be seen by reference to U.S. Pat Nos. 4,428,248; 4,445,393; 4,722,237 and 4,873,881, all assigned to the assignee of this invention and all hereby incorporated by reference.

While the prior art fluidly actuated shift bar housing assemblies are generally satisfactory and are presently widely utilized, usually for remotely controlled and/or automatically controlled change gear transmissions, the prior art assemblies were not totally satisfactory as they were complicated and/or expensive to produce, install and/or service. These prior art systems were also slow and difficult to control due to the compressibility of the air used to power the shift rails. The use of hydraulic fluid proved to be difficult due to leaks in the system which degraded performance and required extensive maintenance.

SUMMARY OF THE INVENTION

In accordance with the present invention, the drawbacks of the prior art are minimized or overcome to the extent that a mechanical actuator is used to load a spring that forces the shift fork into the desired position. No fluids are required to power the shifting mechanism which minimizes the disadvantages of the prior art shifting systems.

The present invention for a gear change transmission shifting system utilizes two ball ramp mechanisms which have a common main drive shaft that is constantly rotated by some type of prime mover such as an electric motor or it can be gear driven from a transmission rotating element. One of the two opposing ball ramp mechanisms (identified as the engagement ball screw mechanism) is frictionally connected to the main drive using an electromagnetic coil to magnetically join a drive plate that is rotated with the main drive shaft to a ball screw drive. The rotation of the ball screw drive causes it to traverse the main drive shaft so as to act against an engagement activation spring that in turn presses against a shift fork. The ball screw induced spring load on the shift fork urges a gear carried by the shift fork into an engagement position. If the gear or the jaw clutch is substantially synchronous with its mating gear, then the fork moves into the engagement position. If the gear or the jaw clutch is not substantially synchronous with the mating gear, then the engagement activation spring continues to apply a load to the fork until synchronization is reached.

The opposing disengagement ball screw mechanism functions in a similar manner to the engagement ball screw to cause the fork to move so as to cause disengagement of the gearing. Thus, the disengagement ball screw loads another activation spring which reacts against the same shift fork but in an opposite direction from the opposing engagement ball screw. As soon as the forces of the gear mesh are reduced, usually through a change in engine torque, the disengagement activation spring forces the fork into a disengagement position.

One provision of the present invention is to provide a gear change transmission shift device that provides for a quick gear shift by preloading a spring operating against a shift fork.

Another provision of the present invention is to provide a gear change transmission shift device that provides for a quick gear shift by preloading a spring operating against a shift fork using a ball screw mechanism.

Another provision of the present invention is to provide a gear change transmission shift device that provides for a quick gear shift event using a ball screw mechanism having a continuously rotating drive shaft.

Another provision of the present invention is to provide a gear change transmission shift device that provides for a quick gear shift event using a ball screw mechanism having a continuously rotating drive shaft with an electromagnetic clutch to connect the drive shaft to a drive flange.

Still another provision of the present invention is to provide a gear change shift device using two opposed ball screw mechanisms, one to engage the gear mesh in a gear change transmission and another to disengage the gear mesh.

DETAILED DESCRIPTION OF THE PREFERRED EMBODIMENT

Figure 1:
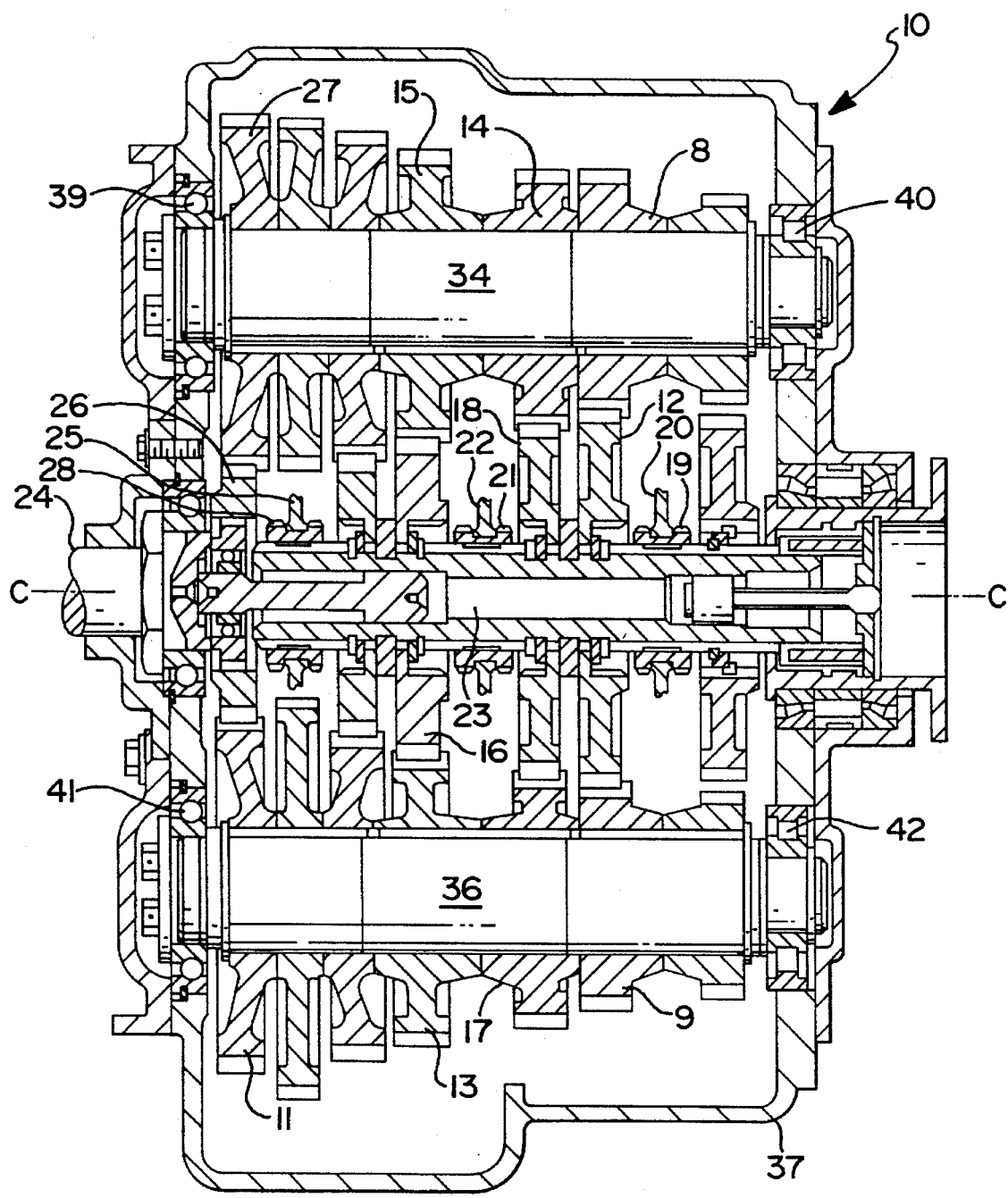
FIG. 1 is a partial cross-sectional view of a prior art change gear transmission with which the ball screw mechanisms of the present invention may be utilized.

In this disclosure, certain terminology will be used for convenience and reference only and will not be limiting. For example, the terms "forward" and "rearward" will refer to directions forward and rearward of the transmission or transmission shift bar housing assembly as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward" will refer to directions as taken in the drawings in connection with which the terminology is used. All foregoing terms include the normal derivatives and equivalents thereof.

Multi-speed change-gear transmissions of both the sliding gear type and the sliding clutch type are well known in the prior art and examples thereof may be seen by reference to U.S. Pat. Nos. 3,387,501; 4,273,004; and 4,296,642 the disclosures of which are incorporated by reference. By "sliding gear type" it is meant those wherein selected gears are moved into meshing engagement with other gears, and by "sliding clutch type" it is meant those wherein constantly meshed gears are selectively clutched to a shaft by means of an axially slidable clutch.

In transmissions of either of the types described above, the slidable member (gear or clutch) is provided with a groove in which a shift fork or shift yoke (or other shifting element) is received for imparting a selected axial movement thereto. The shift forks or yokes are typically carried by, or at least selectively axially moved by, an axially moveable shift rail or shift bar. The shift rail and shift fork carried thereby typically have an axially centered or non-displaced neutral position, and are axially moveable therefrom in first and second opposite axial directions, to engage first and second selected gear ratios, respectively. Accordingly, in transmissions of this type, one shift rail and one shift yoke are required for each pair of selectively engageable gears.

The construction and operation of shift rails, shift forks, etc. (which is not an essential feature of the present invention), may be better understood by reference to U.S. Pat. No. 4,550,627, assigned to the assignee of the present invention, and incorporated herein by reference.

The present invention locates two ball screw actuators, one on each side of each shift yoke, so as to load activation springs disposed between the yoke and the actuators. The shift tower typically mounted to the top of the transmission to control the movement of the shift rails is no longer required since using the present invention, the movement of the shift forks and subsequent shifting of the transmission into the various gear ratios is controlled by the ball screw actuators.

A typical change gear transmission 10 of the "sliding clutch type" with which the ball screw shift assembly 50 (see FIG. 2) of the present invention may be advantageously utilized may be seen by reference to FIG. 1. It should be understood that the present invention may be utilized with a variety of transmission designs, especially those where the gear shifting is accomplished using some type of sliding mechanism to accomplish the shift. Prior art transmission 10 is a simple transmission, or a transmission commonly known as the twin countershaft type which is well known in the art, and which may be understood in greater detail by reference to above-mentioned U.S. Pat. Nos. 3,105,395 and 4,152,949 and whose operation is described in U.S. Pat. No. 4,550,627, assigned to the assignee of the present invention, and incorporated herein by reference.

The illustrated transmission 10 comprises an input shaft 24 carrying an input gear 26 for rotation therewith. Input shaft 24 is intended to be driven by a prime mover, such as an engine, (not shown) through a master clutch or torque converter (not shown) as is well known in the art. A pair of substantially identical countershafts 34 and 36 are rotatably mounted in a housing 37 by means of bearings 39, 40, 41 and 42 respectively. A main shaft or output shaft 23 is provided which is preferably floating and/or pivotally mounted in the transmission housing 37.

Each of the countershafts 34 and 36 carries a plurality of countershaft gears including those shown as 8, 14, 15 and 27 carried and nonrotatably attached to countershaft 34 and gears 9, 11, 13 and 17 fixed to countershaft 36 for rotation therewith. Both countershafts 34 and 36 are rotatably driven by the input shaft 24 through the input gear 26 meshing with gear 27 and gear 11 respectively. A plurality of countershaft gears are constantly meshed with respective mainshaft gears such as countershaft gears 5, 14 and 8 with their respective mainshaft gears 16, 18 and 12. Likewise the countershaft gears 13, 17 and 9 are constantly meshed with mainshaft gears 6, 18 and 12 respectively. The simultaneous meshing of the gears on both countershaft 34 and countershaft 36 allows the input load to be split which gives rise to the nomenclature of the twin countershaft transmission.

The countershaft gears 27, 15, 14, 8, 11, 13, 17 and 9 are fixed to their respective countershafts 34 and 36 while the mainshaft gears 12, 16 and 18 are allowed to rotate relative to the mainshaft 23. The power of the countershafts 34 and 36 are transferred to the mainshaft 23 when one of the mainshaft gears are nonrotatably attached to the mainshaft 23 through the use of a plurality of jaw clutches 19, 21 and 28, one for every two meshing gear pairs. For example, jaw clutch 21 when slid in a forward direction along the mainshaft 23 engages the mainshaft gear 16 and nonrotatably fixes it to the mainshaft 23. Likewise, when the jaw clutch 21 is slid in a rearward direction, it engages mainshaft gear 18 and nonrotatably fixes it to the mainshaft 23. Preferably, as is well known in the art, the mainshaft 23 floats or the mainshaft gears are allowed to float to some degree relative to the countershafts 34 and 36 to allow for load sharing. The advantages of utilizing a floating mainshaft 23 and/or floating mainshaft gears are well known in the art and may be appreciated in greater detail by reference to the aforementioned U.S. Pat. No. 3,105,395.

As discussed previously, axially slidable jaw clutches 19, 21 and 28 are mounted preferably by a splined connection, to mainshaft 23 for axial sliding movement relative thereto, and for rotation therewith. Clutch 21 may be moved forward (to the left in FIG. 1) from the neutral position shown to selectively couple the mainshaft 23 to mainshaft gear 16 completing the flow of power from the input shaft 24 to the input gear 26 which rotates countershaft gears 27 and 11. The rotating countershafts drive gears 15 and 13 which are meshed to mainshaft gear 16. Since gear 16 is now nonrotatably fixed to the mainshaft, the rotational power is transferred to the rest of the driveline.

The jaw clutches 19, 21 and 28 are moved axially along the mainshaft 23 each by a shift fork or yoke 20, 22 and 25 respectively. For example, shift fork 22 is received in a groove in clutch 21 for controlling the axial position of clutch 21 relative to mainshaft 23. Likewise, shift forks 20 and 25 are received in grooves in clutches 19 and 28 respectively for axially controlling the position of the clutches relative to mainshaft 23. The movement of the shift forks 20, 22 and 25 are typically controlled by a shift lever (not shown) mounted in a shift tower mounted to the top of the housing 37. The shift lever through a mechanism moves one or more shift rails to which the shift forks are attached. In the present invention, the axial movement of the shift forks 20, 22 and 25 are controlled by ball screw actuators acting on springs to preload the shift forks as will now be discussed with reference to FIGS. 2 and 3. Note that the ball screw assembly 50 of the present invention is not shown in FIG. 1, but is intended to be used in such a transmission 10.

Transmission 10 is illustrated as utilizing positive nonsynchronized jaw clutches, as is well known in the art. Of course, frictional clutches, synchronized positive clutches and/or blocked clutches may be utilized and are more fully described in U.S. Pat. Nos. 4,194,410; 3,924,484 and 3,799,002, the disclosures of which are hereby incorporated by reference. As only one of the clutches should be engaged at any one time to avoid damage to the transmission, the operation of the ball screw actuators should be coordinated by a suitable electronic control system (not shown) to preclude engagement of more than one gear ratio.

Figure 2:
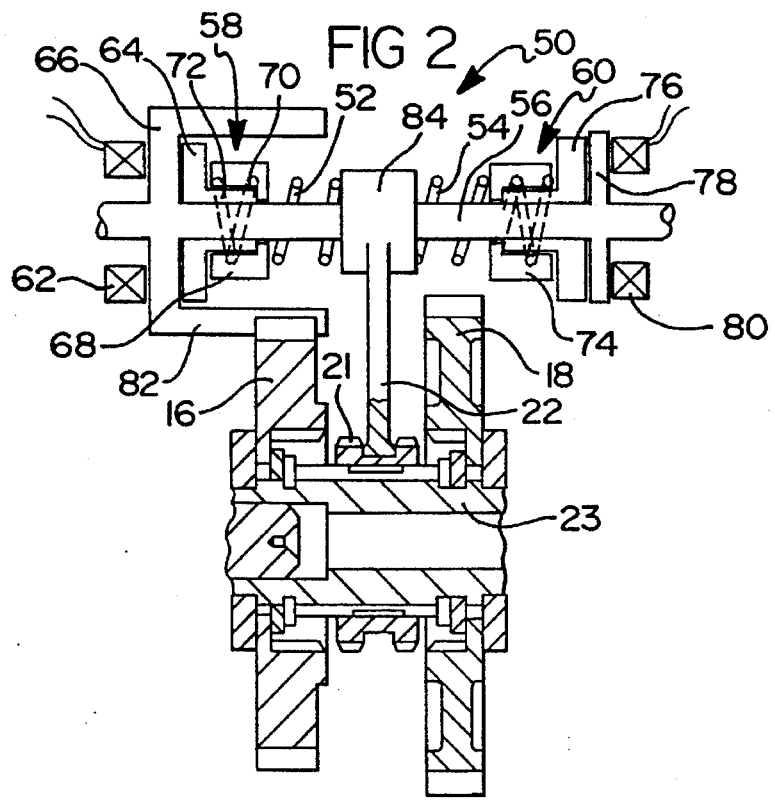
FIG. 2 is a perspective view of the ball screw loaded spring shift mechanism of the present invention in a non-energized state.

Now referring to FIG. 2, according to the present invention, a first ball ramp mechanism 50 is utilized to introduce an axial force into the shift fork 22 through actuation springs 52 and 54. An axial rotating driveshaft 56 powers a first ball screw device 58 and a second ball screw device 60. The ball screw device 58 is coupled to the driveshaft 56 by an electromagnetic field induced by a first coil 62 which electromagnetically couples the main body 64 to a drive flange 66 which rotates with the driveshaft 56. This action causes the main body 64 to rotate relative to the ball nut 68. A helical precision ball groove 70 formed in the ball nut 68 coacts with precision ball grooves 72 formed in the main body 64 through bearing balls (not shown) which circulate in a known manner causing the ball nut 68 to move axially relative to the main body 64. Operation of the ball screw device 58 is disclosed in more detail in U.S. Pat. Nos. 4,981,202 and 4,966,267 the disclosures of which is incorporated by reference. Ball screw device 58 may be of any known type where the ball nut 68 is axially moved relative to the main body 64 upon rotation of the main body portion 64. A mating thread could be used in place of the bearing balls moving between the ball grooves to provide the necessary interface between the main body portion 64 and the ball nut 68.

In a similar manner, ball nut device 60 is operated by electromagnetic action when the coil 80 is electrically energized to couple the drive flange 78 to the main body portion 76 which rotates relative to the ball nut 74 so as to axially move.

The driveshaft 56 is rotated by any rotating element such as by gearing off of one of the transmission gears. In FIG. 2 the driveshaft 56 is rotationally coupled to transmission gear 16 with meshing drive gear 82 which is nonrotationally coupled to the driveshaft 56 through the drive flange 66 and rotates therewith. The driveshaft 56 extends to also power other ball ramp devices (not shown) to effectuate shifting of other gearing in the transmission. Alternatively, the driveshaft 56 can be rotated using an electric or hydraulic motor thereby eliminating the need for drive gear 82.

Figure 3:
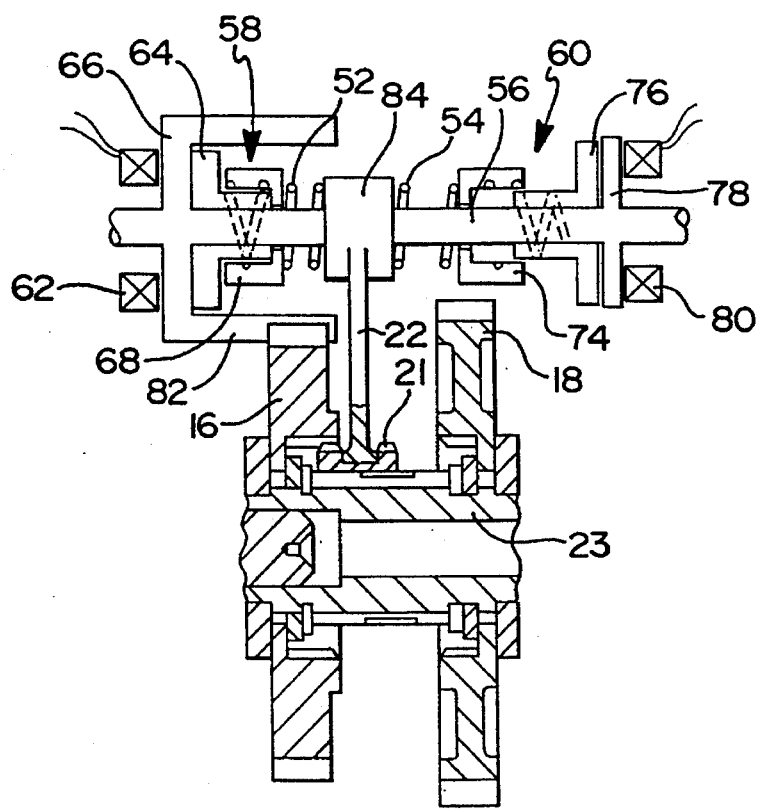
FIG. 3 is a perspective view of the ball screw loaded spring mechanism of the present invention in an energized state.

To effectuate a gear shift to engage mainshaft gear 16, the second electrical activation coil 80 is energized which creates an electromagnetic field and couples the drive flange 78 to the main body portion 76 for rotation therewith. FIG. 3 illustrates the position of the ball nut 74 after rotation of the main body portion 76. Note that both ball nuts 68 and 74 do not rotate and can be keyed to the case 37 or other suitable nonrotating member. The fork collar 84 is axially slidable on the driveshaft 56 and is attached to the shift fork 22. The axial movement of the ball nut 74 causes both the actuation springs 52 and 54 to be compressed as the shift fork 22 is moved laterally forward as shown in FIG. 3 so as to cause the jaw clutch 21 to engage gear 16 and rotational couple it to the mainshaft 23. This action scenario assumes that the gear 16 is in approximate synchronization with the mainshaft 23. If not, the jaw clutch 21 cannot move to engage gear 16. In this case, the ball nut 74 compresses only the activation spring 54 thereby preloading the shift fork 22 through collar 84. When synchronization occurs, the shift fork 22 moves into the position as shown in FIG. 3.

Likewise, the jaw clutch 21 functions to nonrotatably couple the mainshaft gear 18 to the mainshaft 23 thereby providing rotational coupling. Thus, if the ball screw device 58 is energized rather than the ball screw device 60, the activation spring 52 is compressed which preloads the shift fork 22 to move axially rearward until synchronization occurs between gear 18 and the mainshaft 23. When the jaw clutch 21 can engage gear 18, the shift fork 22 moves axially thereby completing the shift.

In a similar manner, any number of ball ramp mechanisms of the present invention can be used to axially move shift forks to cause jaw clutches or other types of axially moveable shift devices to engage transmission gears. The use of activation springs that can be preloaded to supply a force on the shift fork collar allows the shift into gear or out of gear to be completed as soon as synchronization or a torque break occurs without special electronic shift strategy or mechanical complication. When the jaw clutch 21 is not blocked by an excess speed differential between the transmission gear 16 and the mainshaft 23, the shift fork 22 is allowed to move the jaw clutch 21 by action of the preloaded activation springs 52 or 54.

Upon termination of the electrical current to either of the activation coils 62 or 80, the compressed activation spring on the opposite side of the shift fork collar 84 as the activated ball screw device 58 or 60 causes the shift fork 22 to move back to the nonegagement position as shown in FIG. 2 when a torque break occurs usually induced by manipulation of the engine throttle and the jaw clutch 21 is disengaged from the transmission gear 16 or 18.

The ball screw mechanisms 58 and 60 are comprised of the ball nuts 68 and 74 and the main body portions 64 and 76 respectively. The construction and operation of a ball screw is well known in the art. This particular type of mechanism is used to axially move many types of prior art devices such as the secondary flight control surfaces on airplanes. The rotation of the ball main body relative to the ball nut in a given direction causes the ball nut to separate from the main body portion to an end point where its motion stops even with continued rotation. This can be achieved using a mechanical stop on the driveshaft 56 (not shown) or through design of the ball screw mechanism to reach an end point defined by radial travel of the balls without axial translation of the ball nut. Rotation of the ball sleeve in the opposite direction is caused by activation spring 52 or 54 loading and causes the ball nut to move in an opposite direction reaching the end of travel as defined by contacting the main body whereupon the axial motion and the relative rotation of the ball screw stop. In the present invention, the relative axial motion which causes the ball ramp device to contract is supplied by the activation springs 52 and 54 which are compressed even when in the neutral position. Thus, when the electrical current is terminated at the coils 62 and 80 the ball screw devices 58 and 60 return to a collapsed nonenergized state by action of the activation springs 52 and 54.

Although this invention has been described in its preferred form with a certain degree of particularity, it is understood that the present disclosure of the preferred embodiment has been made only by way of example, and that numerous changes in the detailed construction in combination and arrangement of the parts may be resorted to without departing from the spirit and the scope of the invention, as hereinafter claimed.

I claim:

1. A transmission shifting system for a transmission of the type wherein a plurality of transmission gears are shifted into rotational relationship with a transmission shaft using a sliding shift fork, the system comprising:

a rotating driveshaft having at least two drive flanges;

at least one shift fork disposed to axially slide along said driveshaft between said drive flanges;

a pair of activation springs disposed one on each side of said shift fork, between said drive flange and said shift fork;

a pair of linear actuators each acting to compress a corresponding activation spring upon activation, said spring forcing said shift fork axially so as to cause a transmission gear to become engaged and disengaged;

a pair of electrical coils disposed to induce an electromagnetic field in said drive flange thereby electromagnetically coupling said linear actuator to rotate with said driveshaft.

2. The transmission shifting system of claim 1, wherein said linear actuators are of the ball screw type having a main body rotated with said drive shaft upon excitation of said electrical coil acting to axially displace a ball nut riding on threaded sections formed in said main body and corresponding threaded sections formed in said ball nut.

3. The transmission shifting system of claim 2, wherein said ball nut is coupled to said main body using a plurality of balls disposed to engage said threaded sections formed in said main body and in said ball nut.

4. The transmission shifting system of claim 3, wherein one of said linear actuators is energized to axially displace said shift fork in a first direction and said the other of said linear actuators is energized to axially displace said shift fork in a second direction.

5. The transmission shifting system of claim 1, wherein said shift fork acts upon a jaw clutch to rotationally engage a transmission gear.

* * * * *